(12) United States Patent
Nath et al.

(10) Patent No.: US 9,142,142 B2
(45) Date of Patent: Sep. 22, 2015

(54) IN-CAR DRIVER TRACKING DEVICE

(71) Applicant: Kaarya LLC, Torrance, CA (US)

(72) Inventors: Ujjual Nath, Manhattan Beach, CA (US); William Fletcher, Westlake Village, CA (US); Brian Billett, Los Angeles, CA (US)

(73) Assignee: Kaarya, LLC, Signal Hill, CA (US)

( * ) Notice: Subject to any disclaimer, the term of this patent is extended or adjusted under 35 U.S.C. 154(b) by 197 days.

(21) Appl. No.: 13/872,173

(22) Filed: Apr. 29, 2013

(65) Prior Publication Data
US 2013/0244210 A1 Sep. 19, 2013

Related U.S. Application Data

(63) Continuation-in-part of application No. 13/323,715, filed on Dec. 12, 2011, now Pat. No. 8,452,479.

(60) Provisional application No. 61/421,642, filed on Dec. 10, 2010.

(51) Int. Cl.
G06Q 40/08 (2012.01)
G09B 19/16 (2006.01)
G07C 5/00 (2006.01)
G07C 5/08 (2006.01)
B60W 40/09 (2012.01)

(52) U.S. Cl.
CPC ............. *G09B 19/167* (2013.01); *G07C 5/008* (2013.01); *G07C 5/085* (2013.01); *B60W 40/09* (2013.01); *B60W 2530/14* (2013.01); *B60W 2550/22* (2013.01); *B60W 2550/402* (2013.01)

(58) Field of Classification Search
USPC .......... 701/36, 29.1, 33.7, 2, 29.6, 29.7, 31.5, 701/32.1, 32.7, 424; 434/65; 706/11; 705/4
See application file for complete search history.

(56) References Cited

U.S. PATENT DOCUMENTS

| 8,248,223 B2 * | 8/2012 | Periwal .................... 340/441 |
| 8,630,768 B2 * | 1/2014 | McClellan et al. ............. 701/36 |
| 8,655,544 B2 | 2/2014 | Fletcher et al. |
| 8,670,929 B2 | 3/2014 | Miller |
| 2008/0120025 A1 * | 5/2008 | Naitou et al. ................. 701/207 |
| 2012/0150387 A1 | 6/2012 | Watson et al. |
| 2012/0303392 A1 * | 11/2012 | Depura et al. .................... 705/4 |
| 2013/0166326 A1 * | 6/2013 | Lavie et al. ....................... 705/4 |
| 2013/0289873 A1 | 10/2013 | Mitchell |

* cited by examiner

*Primary Examiner* — Adam Tissot
(74) *Attorney, Agent, or Firm* — Brian Billett

(57) ABSTRACT

Disclosed are a device and method for providing driver tracking and behavior analysis, initiated without concurrent user input, by the presence detection of one or more drivers of the vehicle. Vehicle motion inferred from a location aware device sensor, as well as other driver smartphone sensors and application use are logged and analyzed to determine risk factors associated with identified drivers. Internet data sources are further utilized for associating road conditions and traffic regulations with the logged locations of the vehicle. Logged and analyzed data from the identified drivers is aggregated for reporting on vehicle risk.

9 Claims, 11 Drawing Sheets

IN-CAR DRIVER TRACKING DEVICE

This application is a continuation-in-part of pending application Ser. No. 13/323,715, filed on Dec. 12, 2011, which claims the benefit of U.S. Provisional Application 61/421,642. Both identified applications are incorporated herein in their entirety.

FIELD OF THE INVENTION

The present invention generally relates to the field of vehicle telematics and location based driver tracking.

BACKGROUND OF THE INVENTION

Driver tracking is a long standing problem with broad applications for parents, company and fleet vehicles, rental car agencies, and vehicle insurance carriers. Previous solutions do not provide an ability to automatically and reliably track individual drivers when they are operating a vehicle. For each of these functions, establishing the identity of a driver for a vehicle with multiple drivers can be highly relevant, for example for an insurance carrier to assess the assumed risk when insuring the vehicle. Fleet management, parents, and other owners each have a special interest concerning the safe operation of vehicles.

Numerous efforts have been undertaken to monitor vehicle risk over time. A variety of systems have been proposed for monitoring vehicle behavior to assess risk, U.S. Pat. No. 6,064,970 Craig et. al., at times including geo-location as risk factors, U.S. Pat. No. 7,343,306 Bates et. al. All of these have two key limitations, including the inability to differentiate and measure behavior of individual drivers, and the reliance on input from manufacturer vehicle sensor systems through the on-board diagnostic system (OBD). As explained below, the OBD has its own set of problems, including that a plurality of the available data is generally proprietary to the manufacturer. The difficulties for interacting or even reading manufacturer proprietary sensors was the motivation for the new open source interface standard pioneered by Ford research known as OpenXC. Unfortunately only a handful of even Ford vehicles are OpenXC compatible. The risk of a vehicle accident is not the only reason to monitor vehicles and drivers. Another is vehicle maintenance.

Vehicles, particularly internal combustion engine powered vehicles, require the replacement of consumable components or resources for extended operation. The most obvious of these is the vehicle fuel. Fuel gauges (or charge gauges in the case of electric vehicles) are prominently displayed to the driver. Drivers can thus generally predict when the fuel stored on-board the vehicle will be consumed, and can replenish the consumed fuel before the vehicle is stranded.

A number of other components of vehicles need regular service in addition to refilling the fuel, but the determination of necessary service is not nearly as simple. This includes the engine lubrication, the engine coolant system, the vehicle braking friction surfaces, the lubrication and air intake filters, and spark plugs among others. Most important among these is the engine lubrication, which has a widely variable lifespan depending on, among other factors, the operation of the vehicle and the environment of the vehicle operation. Although these variances are well-known in the art, they are difficult to track, and most vehicle manufacturers recommend fixed intervals of vehicle mileage or time between servicing these vehicle components. Systems such as Jones U.S. Pat. No. 5,705,977 and Touhey U.S. Pat. No. 6,927,682 provide third-party solutions for notifying drivers of required service based on manufacturer recommended maintenance service intervals. These systems are limited in many respects, including their limitation for failing to account for variable vehicle operation and conditions.

Improved service interval reminder systems have been developed which account, in some manner, for vehicle operation, such as Bai U.S. Pat. No. 7,129,827, which provides maintenance service interval adjustments based upon vehicle operating time, and Muhlberger et. al. U.S. Pat. No. 4,533,900, a system for recommending service intervals based upon both mileage and various engine sensor readings used to detect high load conditions. Such modified service interval systems are useful, but suffer certain limitations. Systems such as Bai U.S. Pat. No. 7,129,827 do not factor the load condition or operating conditions of the vehicle which may have significant impact on the service requirements of the vehicle. Systems such as Muhlberger et al U.S. Pat. No. 4,533,900 rely upon engine sensor input, which may not be available for a particular vehicle and a connection to the vehicle odometer, which is generally only available to the vehicle manufacturer due to the security sensitivity of the odometer electronic signal access.

Currently, no service interval adjustment and notification system accounts for both mileage and load factors on the vehicle wear, without reliance upon a direct connection to the vehicle sensor systems.

SUMMARY OF THE INVENTION

It is a general object of the invention to provide a platform for providing service interval notifications to a vehicle operator, and to incorporate relevant vehicle operating conditions, which most directly impact the longevity of engine lubrication and other wear-prone components of vehicles.

It is a specific object of the invention to provide such a platform for service interval notification without reliance on vehicle sensor systems, as such systems may not be available, or may themselves but unreliable during the service interval.

One embodiment of the invention is for a device and system which provide a telematics solution for tracking individual drivers of a vehicle by identifying drivers by the detection of a short range data identification signal from a driver's mobile device. As is described below for providing a means for tracking a vehicle and analyzing the vehicle motion for determining vehicle service needs, the ability to track individual drivers is an alternate embodiment of this invention.

Another embodiment of the invention is for a device and system which provide a vehicle owner or operator with predictive notification for periodic vehicle service. The implementation of this embodiment of the invention departs considerably from prior efforts to provide such a solution in several novel and important aspects. 1) The invention device and system do not rely upon any data or sensor connectivity with the vehicle, 2) the invention device and system provide a standardized and vehicle independent intelligent means for monitoring relevant factors of vehicle wear, and 3) the invention device and system incorporate new and novel relevant factors for adjusting the predicted service interval.

It is well known in the art that engine lubrication, particularly for internal combustion engines, is the most critical engine component that both prevents engine wear and is simultaneously most prone to deterioration and loss of efficacy. According to the treatise on engine lubrication wear and breakdown, Significance of Tests for Petroleum Products, ed. S. Rand, *Automotive Engine Oil And Performance Testing*, Schwartz and Calcut, pp 140-143, the most significant factors affecting internal combustion engine lubrication wear include a) the amount of city vs. freeway driving, b) high load, high temperature operation, and c) the frequency of "cold" and "winter" engine starts. According to Schwartz and Calcut, wear during city driving is far greater than freeway driving, as is the case during high load, high temperature conditions, such as extended mountainous driving. Most critical to rapid breakdown of engine oil which would require a shortened service period are the frequencies of "cold" (engine at ambient temperature), and "winter" (a cold engine start with very low ambient temperature) engine starts.

The findings of Schwartz and Calcut, which although widely accepted in the art, are not frequently utilized for adjusting service intervals. The present invention incorporates these findings in general and embodies them as model parameters into the service interval adjustment platform model of the invention.

Another component of these embodiments of the invention is the utilization of a location aware sensor device to provide an accurate and reliable sensor input for tracking vehicle motion, and thus both mileage and operating patterns of the vehicle, without any direct vehicle sensor input.

In one embodiment of the invention, the platform device of the invention is an adapted use of an operator's smart phone, which generally provides the capability of a location aware sensor, such as the Global Positioning System (GPS), a means for wireless data communication with the Internet, and a means for detecting proximity to the operator's vehicle, such as by Bluetooth® pairing or another means for detection of the identification signal broadcast by short range data transmission operation. An alternate embodiment of the invention is a dedicated on-board device with these same attributes and likewise no direct connection to the vehicle sensor system. Another embodiment for tracking and reporting on individual driver behavior for risk analysis is disclosed below.

In the present invention, when in proximity to the operator's vehicle, the utilization of the location aware system provides a means for identifying and calculating vehicle operating conditions into four domains of engine wear factors, including city vs. highway driving, the "cold" start factor, the "winter" start factor, and the mountainous/high load factor. Tracked vehicle mileage is adjusted according to these factors and compared against the manufacturer standard recommendation for service in order to obtain an improved vehicle service interval prediction.

In embodiments of the invention which incorporate individual driver identities, the same method is used to initiate vehicle tracking by detecting the proximity or presence of a driver using short range data communication. In these embodiments of the invention, the identification of individual drivers is also utilized during the data analysis and reporting. Driver identification is used for tracking not only the vehicle motion alone, but for the vehicle motion attributed to individual drivers. For example, by logging the driving and other risky behaviors of individual drivers, the system can be applied to a variety of long standing problems. Disclosed is the application of the individual driver tracking to the adjustment of insurance premiums benefitting or penalizing lower than average or higher than average risk driving.

BRIEF DESCRIPTION OF THE DRAWINGS

FIG. 1 illustrates a simplified overall logic flow of the service interval adjustment embodiment of the device.

FIG. 1A illustrates a simplified overall logic flow for the invention embodiment for individual driver tracking and risk analysis.

FIG. 2 illustrates the preferred embodiment general interaction of the device invention with the navigation satellite broadcast (location awareness system example), as well as the user (by mobile telephone) and the data collection hub and information system operated by the system management company.

FIG. 7 provides an example of an alternative embodiment device component architecture.

DETAILED DESCRIPTION OF THE INVENTION

Figure 1:
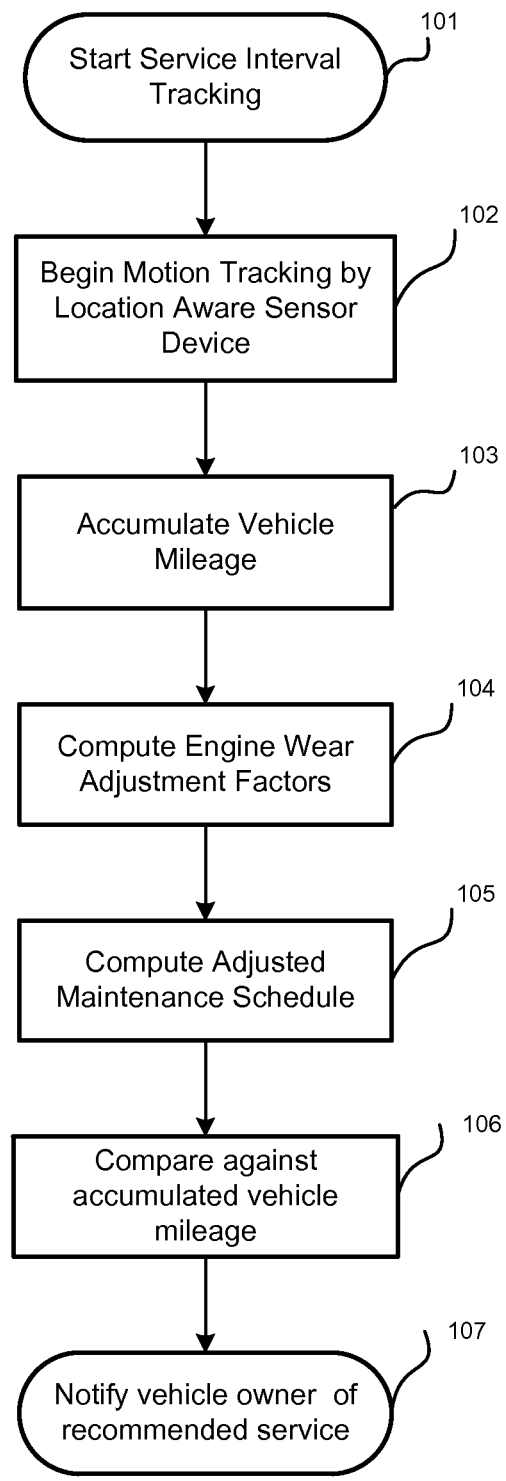
FIG. 1, FIG. 1A, FIG. 2, and FIG. 7 illustrate the overall architecture of the present invention device and system in the preferred and alternate embodiments.

The device and system of the current invention in the preferred and alternate embodiments include a navigation position aware sensor 202, 701, a wireless communication component 203, a programmable central processing unit (CPU) 702, with associated volatile 703 and non-volatile memory 704, for controlling 705 and monitoring the system input and providing relevant output to the user (via General Packet Radio Service or GPRS, for example 706) 203, 313 when queried or when the automated embedded intelligent system predicts an impending need for service.

The location aware sensor 202/203, 301, 701 embedded within the device may utilize any available wireless location awareness system, including but not limited to GPS, GNSS, GLONASS, BD2, cellular tower triangulation, WiFi triangulation, or assisted GPS. This described embodiment of the invention utilizes the GPS system as the primary sensor input.

GPS, or the Global Positioning System, consists of a system of global satellites which continuously transmit very precise time signals via radio frequency broadcasts directed to the earth surface. Devices utilizing GPS for location awareness infer the latitude, longitude, time, and elevation of the receiving device based on the differential between the timing of received GPS satellite broadcast signals. These 4 input parameters: latitude, longitude, elevation, and time, are the primary input data for the invention device and system disclosed in preferred and alternate embodiments.

Figure 1A:
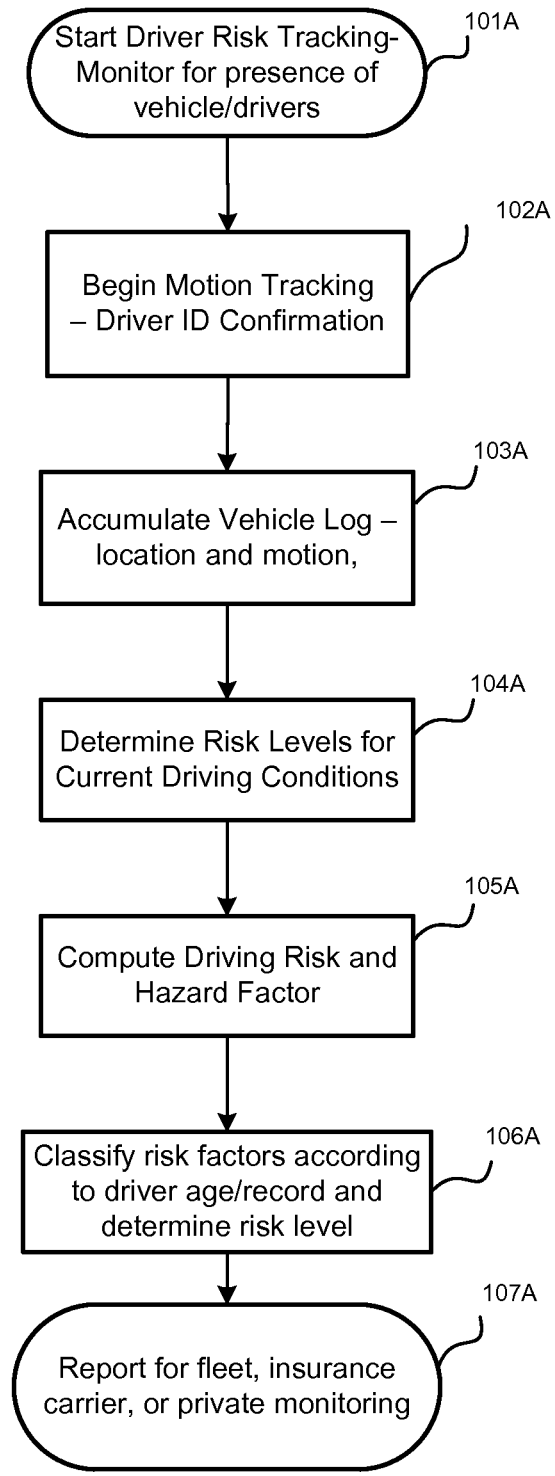
Figure 2:
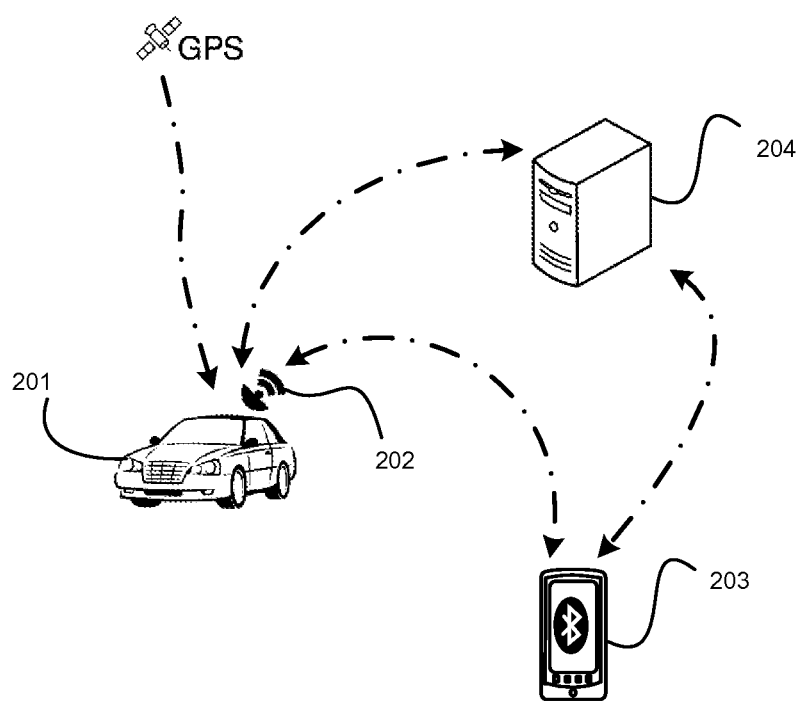
Figure 3:
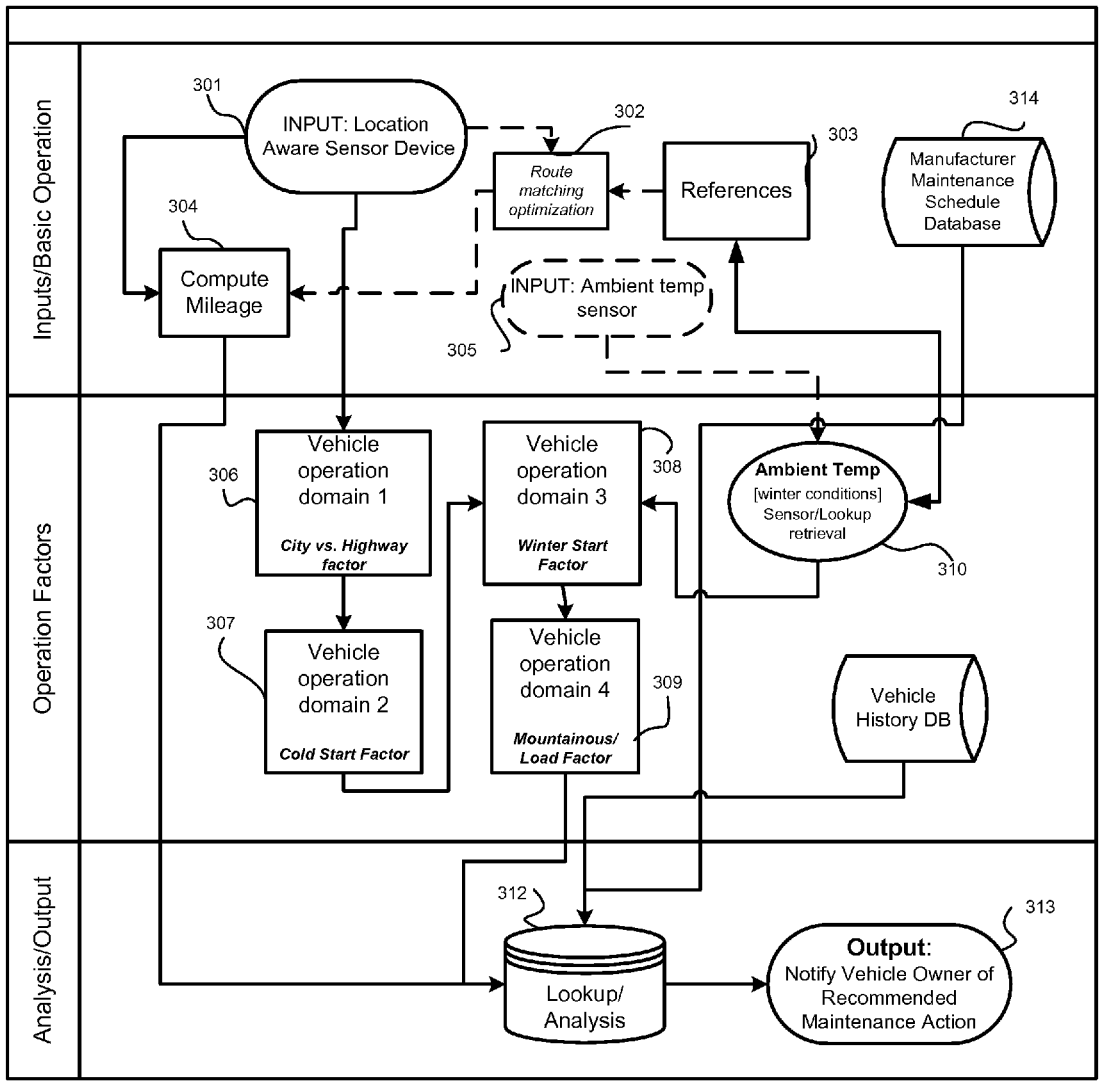
FIG. 3 is a more detailed overall logic flow for the invention embodiment for service interval adjustment.
Figure 3A:
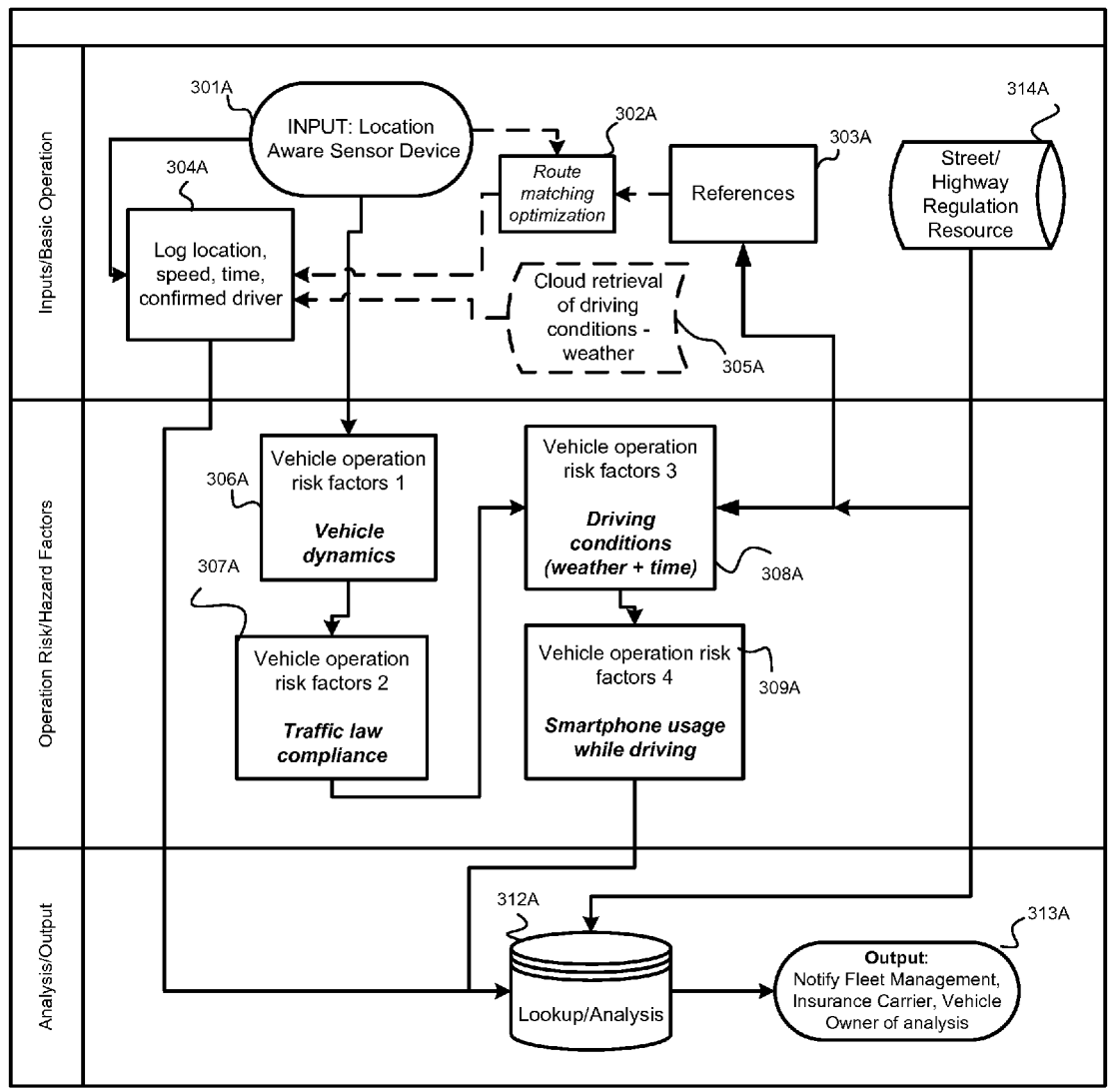
FIG. 3A is a more detailed overall logic flow for the invention embodiment for individual driver tracking and risk analysis.
Figure 8:
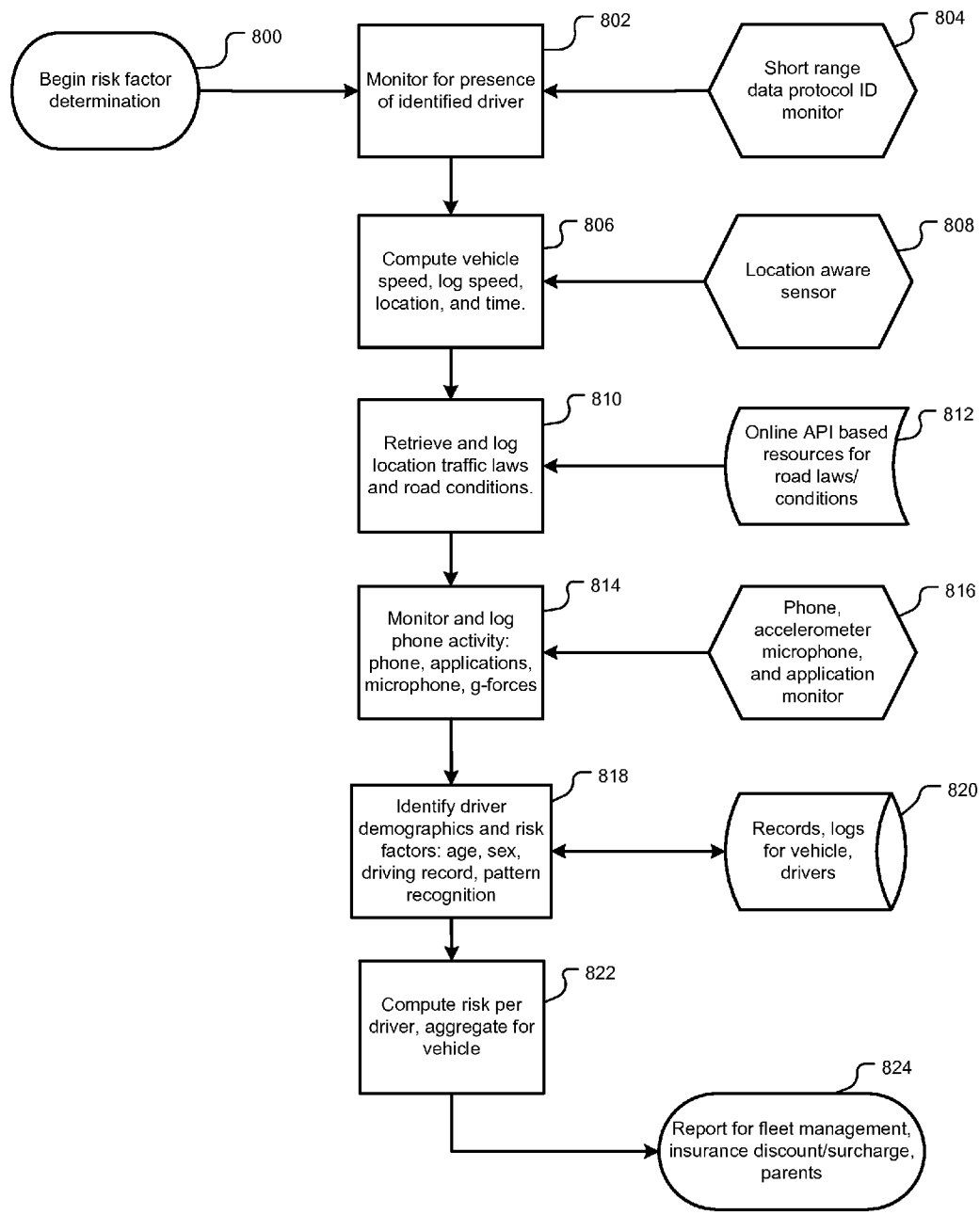
FIG. 8 details the process, including Internet sources and mobile device sensors for determining risk factors.

In an alternative embodiment of the invention shown in FIGS. 1A and 3A, another primary input parameter to the system includes the driver identity as detected by the short range data communication capability which is utilized for proximity detection between the driver and the vehicle. Also, as shown in FIG. 8, vehicle motion is inferred from the device's accelerometer, specifically unusual g-forces within a specific range indicating the vehicle has either swerved or the driver has abruptly braked the vehicle. Either of these indicates high risk, and repeated rapid braking has been identified as a means for detecting tailgating. The device microphone, phone, and other application activity provide additional input as further detailed below.

In this embodiment, additional secondary information may be obtained from cloud services to determine local temperature or weather or driving conditions based upon location and time/day. Other cloud sources are used to provide log input for localized traffic laws, which can be matched with driver locations and motion for compliance.

The device of one embodiment of the invention tracks service intervals and makes relevant adjustments to such intervals for notifying the vehicle operator of necessary scheduled maintenance. FIG. 1 provides a simple explanation of the device operation. When the device begins operating 101 (whether vehicle proximity is detected or the device is installed in the vehicle), the location aware sensor of the device tracks the vehicle motion 102, which is accumulated as total vehicle mileage 103, an equivalent sensor to the vehicle odometer. As detailed below, the engine wear factors are calculated based upon vehicle motion, vehicle elevation, and ambient operating temperature 104. Based upon these wear factors and the manufacturer's suggested service schedule, an adjusted vehicle service interval is computed 105, and compared against the accumulated vehicle mileage 106, to determine whether the vehicle operator should be notified of an impending necessary service action 107.

In another embodiment of the invention which provides individual driver tracking and risk analysis for application such as fleet management, and adjusting insurance premiums. FIG. 1 provides a simple explanation of the device operation. FIGS. 3A, and 8 detail variations of this embodiment which include additional sensor input. When the device begins operating 101A (initiated when vehicle presence is detected by the driver's mobile device or the device is installed in the vehicle and detects the presence of a driver), the location aware sensor of the device tracks the vehicle motion 102A, which is logged according to the detected identity of the driver and includes driven routes, times, and vehicle speeds driven as well as accumulated mileage 103A. As detailed below, the risks associated with these driving habits and identification of drivers is determined according to routes and driving conditions. 104A. Based upon the driver logged behavior, and driving conditions, the risk or hazard factor is computed 105A. Driver identity is incorporated by factoring the age, sex, and driving record actuarial adjusted risk and a consolidated risk level is determined to compare against the average risk. Such a comparison may be utilized for example by insurance carriers 106A, to determine any discount or surcharges that may apply to the vehicle coverage 107A.

In all embodiments of the invention, the device initiates the process of logging and tracking automatically by the presence determination of matching a driver to the vehicle by monitoring a short distance communication signal protocol for known identification tags of a signal source. This is for example used in the process when paired Bluetooth® devices link, or during monitoring for devices in Bluetooth® discoverable mode. This method is not unique to Bluetooth but can be utilized in a variety of short distance communication protocols well known in the art.

Regarding the service interval adjustment embodiment of the invention, FIG. 3 is an overview of methodology and logic utilized by the device to perform the intelligent monitor and notification functions. As mentioned above, GPS is the chosen location aware sensor system for this embodiment of the invention and generates output data including the latitude, longitude, elevation and time as shown in 301. Mileage, or the aggregate distance traveled by the location aware device is computed in 304 with computational details outlined in FIG. 4. A straight line approximation of distances traveled by the device can suffer from sampling error analogous to aliasing error. Although the primary embodiment of this invention does not include methodology for correcting route errors, the full invention claimed includes an alternative embodiment which incorporates one of several available route matching optimization techniques, which are incorporated as 302 and rely upon wireless data queries to mapping data sources such as Google or stored mapping databases such as Navteq 303.

Another point of novelty and utility of the disclosed invention is the capability to infer vehicle operating conditions which adversely affect wear without relying upon vehicle sensor data, which varies widely between manufacturers and remains years away from standardization beyond basic emissions system sensor information. The invention capability to predict and adjust forthcoming regular vehicle maintenance is shown in FIG. 3 components 306, 307, 308, and 309. An embodiment of this invention to perform this function is detailed below and in FIGS. 4-6.

Based upon published peer reviewed data sources, including learned texts such as the aforementioned work by Schwartz and Calcut, and Society of Automotive Engineers (SAE) research publications, this invention asserts four operating conditions which are utilized to modify the normal service period predictions, which are generally based only upon mileage, or in the alternative, based upon Original Equipment Manufacturer (OEM) specific sensor information. These four factors include a) the percentage of "city" vs. "highway" driving, b) the frequency of engine "cold" starts following a period where the engine has sufficient time to dissipate heat and return to the ambient temperature surrounding it, c) the frequency of extreme "winter" cold starts, which have been identified as an extremely high wear condition, and d) steep grade highway driving, which places an unusually high load condition on the engine.

In order to determine if the frequency of the very high wear "winter" cold starts of the vehicle, the ambient temperature 310 is required. Potential sources for this information include an optional embedded sensor 305, such as a thermocouple and associated data acquisition (DAQ) input for the system, or by utilization of Internet based weather data, such as the National Weather Service, which have the ability via an available application programming interface (API) to provide real-time temperature information corresponding to a latitude/longitude query of the data provider 303.

Certain vehicle historical data are input by the user when the device is initially installed, include either the vehicle identification number (VIN) or vehicle make, model number and year, as well as the current odometer mileage reading 311. This information is utilized to establish a baseline to compare with the manufacturer recommended service schedule intervals 314, which in turn act as a baseline for the invention capability for adjusting service interval prediction according to unusual wear operating conditions. As detailed in FIGS. 4-6, this information is utilized to perform an optimization of vehicle service prediction 312.

Figure 4:
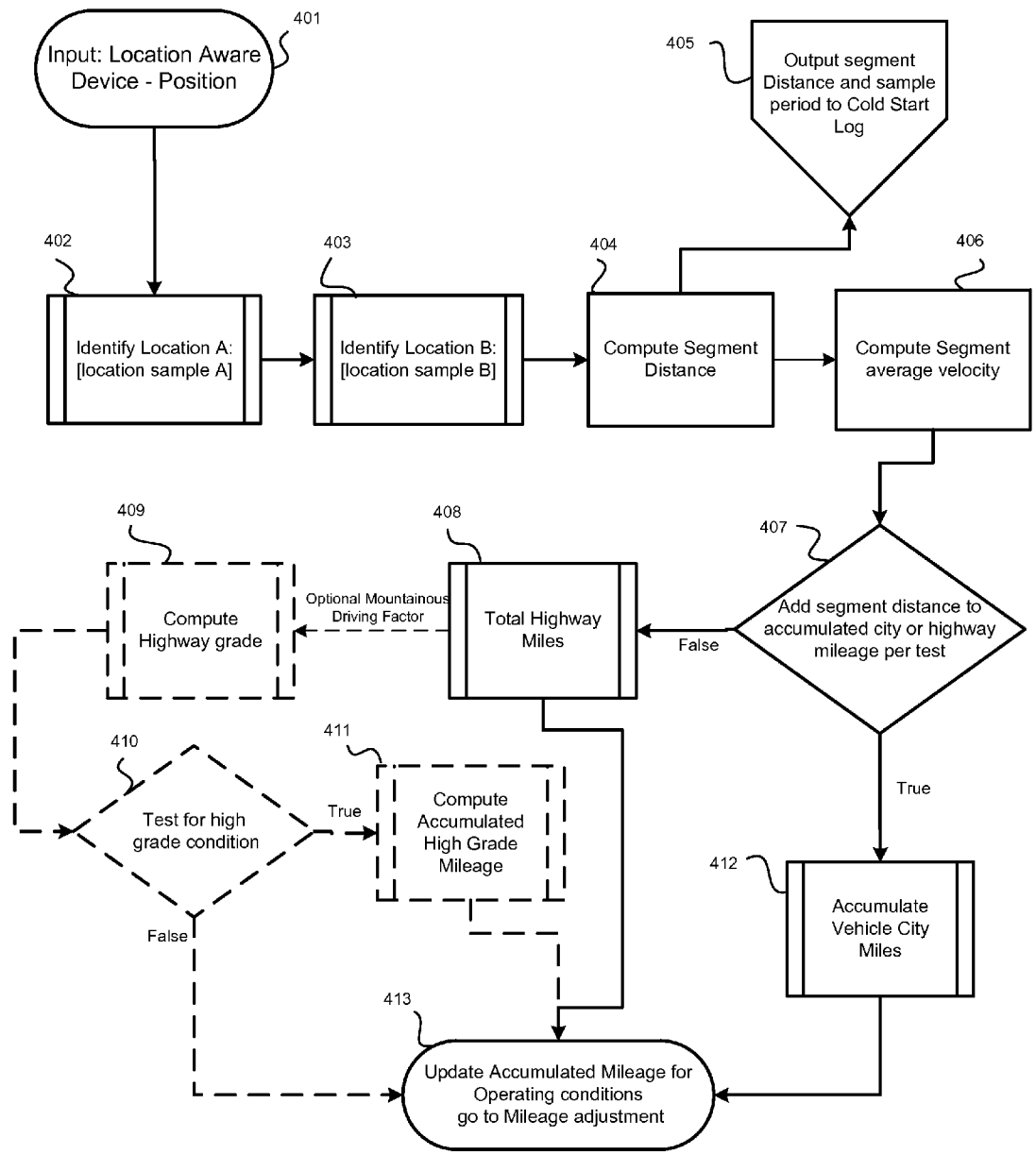
FIG. 4 details the preferred embodiment method for determining the fraction of "city" and "highway" driving patterns.

A detailed outline of one embodiment of the invention device and process for the decision and computation to determine and accumulate logged values for "city" and "highway" driving are shown in FIG. 4. Parameters and Output data include the following:

Parameters:
$V_h$=vehicle speed threshold for city vs. highway miles
$T_{sam}$=Sampling time
$Grade_{load}$=highway grade threshold for high load condition Outputs:

$D_{city}$=accumulated city mile
$D_{highway}$=accumulated highway miles
$D_{load}$=accumulated high load miles
$D_{seg}$=distance traveled between navigation segments The process or device operation for the invention embodiment which performs individual driver tracking and risk analysis for adjusting insurance premiums is shown in FIG. 3A. As mentioned above, once proximity is detected to an identified driver of the vehicle, tracking initiates. GPS is the chosen location aware sensor system for this embodiment of the invention and generates output data including the latitude, longitude, elevation and time as shown in 301A. A logged record of the vehicle driving along with correlation with the identified driver are saved 304A, and optionally may include driving conditions (traffic, weather, rain, snow, fog) 305A In order to incorporate detailed geographic information for the logs, cloud based references 303A could be incorporated into route matching optimization 302A as described above and detailed in FIG. 4.

The driving log and risk assessment invention embodiment next incorporates the various operation risk domain assessments shown in FIG. 3, 306A, 307A, 308A, and 309A. First, in 306A the driver accumulated driving mileage and driving time are incorporated as risk factors. The more time spent driving or the more distance driven are the most basic and obvious factors. Previous efforts have used the distance a vehicle has been driven as the sole factor for adjusting policy costs. This embodiment differs from these previous efforts in that it includes both the time driving, and the identity of the driver. The fraction of mileage driven or time a vehicle is driven by identified higher risk drivers for a vehicle with multiple drivers, is a novel feature of this embodiment.

Next, in this embodiment of the invention, the actual location of the vehicle and identity of the driver are factored into the risk assessment. For example, if one lives in a safe suburb, then commuting to the inner city everyday will increase the risk assessment. The reverse is also likely to be true. Also, for fleet vehicle tracking, rules regarding these factors have been implemented in fleet tracking devices, but without the capability to identify the driver, other than through the fleet records. Vehicle location risk factors are incorporated into the risk assessment 307A.

Of course an obvious risk factor is simply compliance with the rules of the road. This is addressed in this risk model and assessment 308A by incorporating input from municipality resources regarding posted and un-posted vehicle code regulations for drivers 314A. Driver logs are compared against these retrieved regulations for compliance and for flagrant disregard or negligence.

Figure 5:
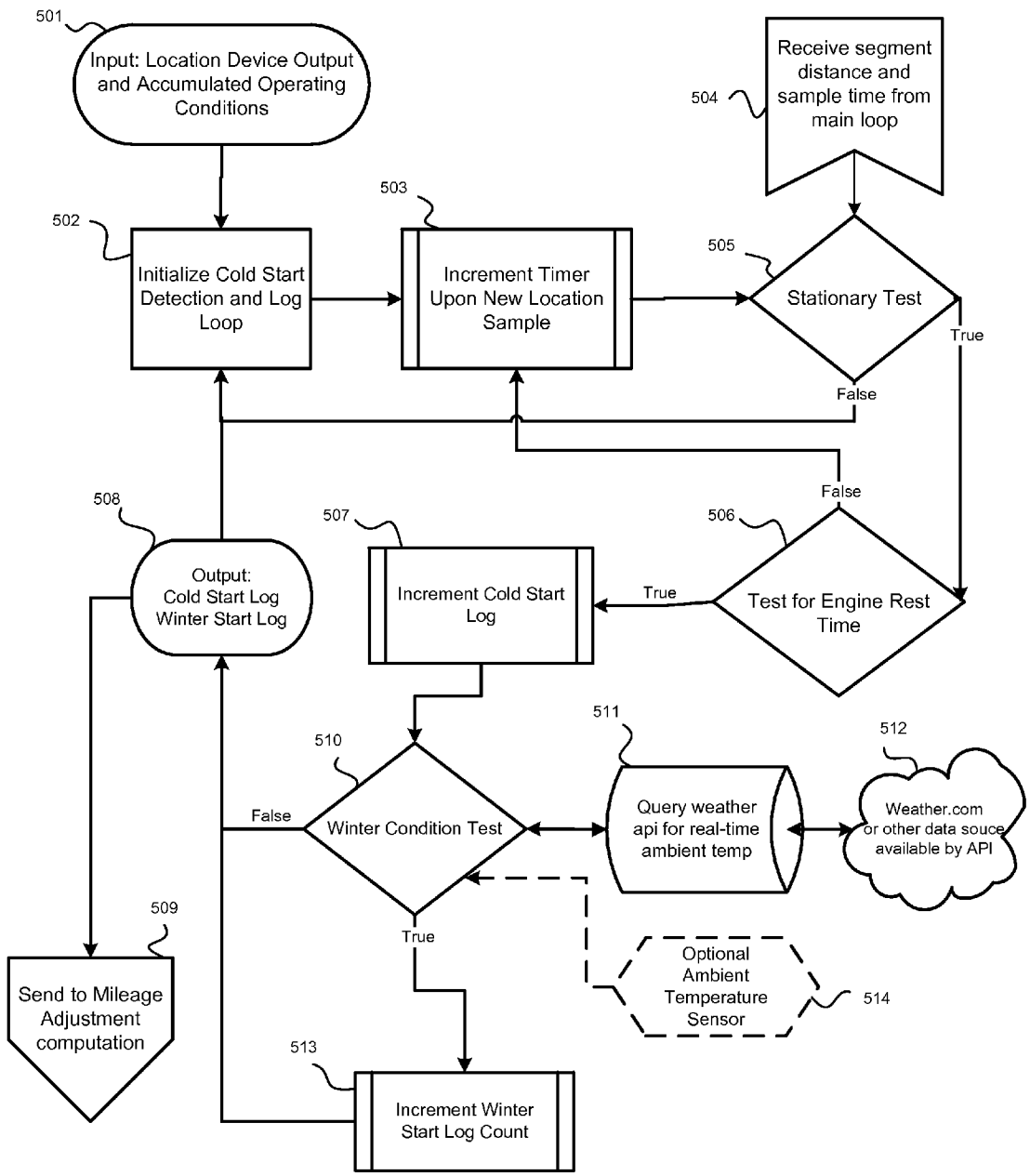
FIG. 5 details a methodology for determining abnormally high frequencies for "cold" engine starts, and for engine starts under extreme winter conditions.
Figure 6:
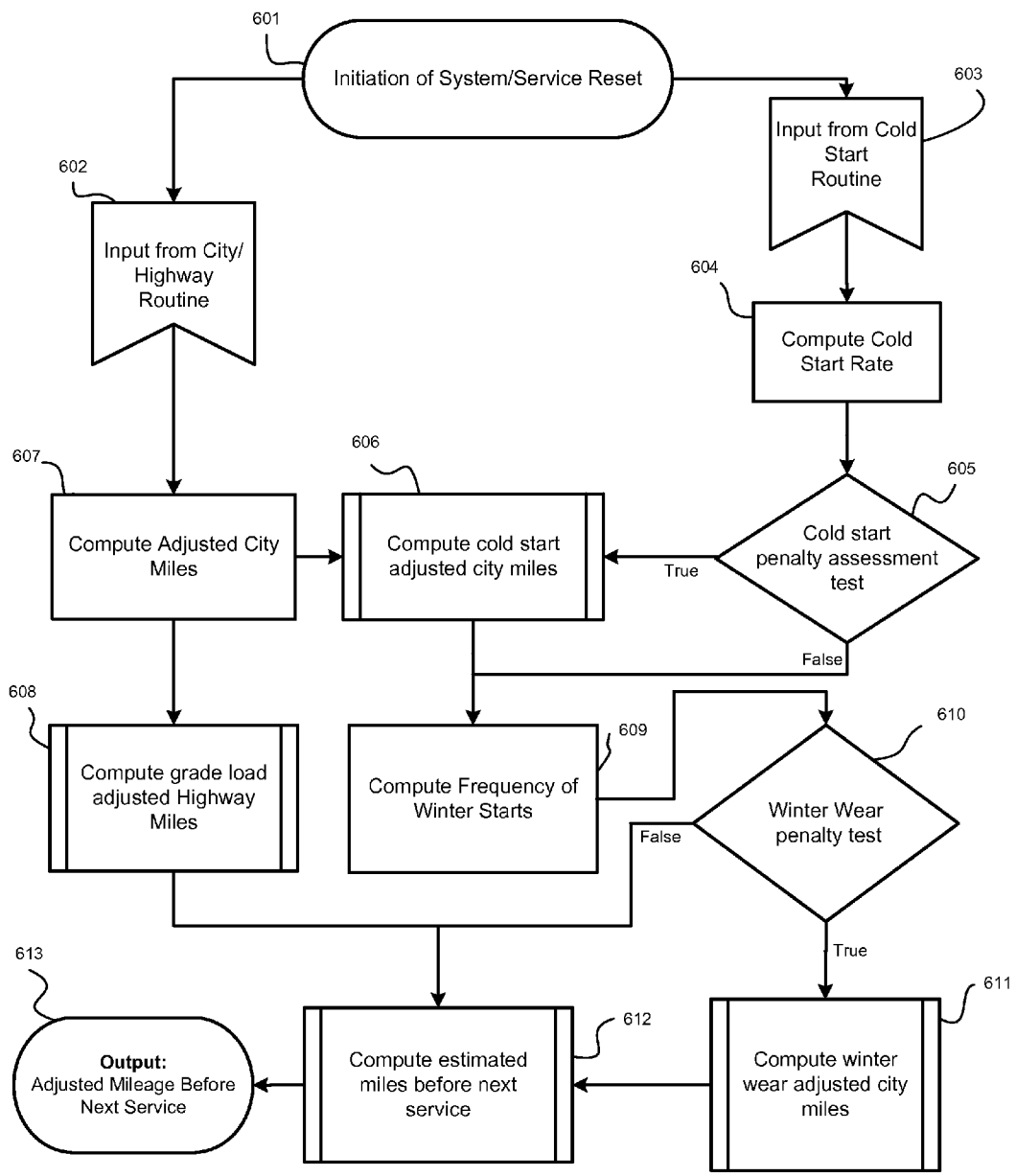
FIG. 6 details a specific methodology for adjusting the maintenance schedule according to adjustment factors and vehicle (device) operation determined by the logic from FIGS. 4 and 5.

FIG. 4-6 detail algorithms implemented on a device, for determining vehicle wear from the usage information available from a mobile device alone. The alternate embodiment of the invention for risk expectation assessment uses similar and widely published risk assessment metrics based on similar driving data.

System inputs 401 latitude, longitude, time, and elevation, provide sufficient information for the current invention to determine the recognized and disparate wear conditions well known as "highway" and "city" driving.

Upon initiation of the device, once the device is successful in its initial location determination at $T_1$, the sample time in 402, it continues to sample location information from the GPS system at intervals $T_{sam}$ identified above. The next sampled device location is stored according to 403 at time $T_2$ (or $T_1+T_{sam}$). Earth surface land distance between locations sampled at $T_1$ and $T_2$ are calculated in this embodiment of the invention according to the accepted Haversine formula:

$$d_{lon}=lon_2-lon_1$$

$$d_{lat}=lat_2-lat_1$$

$$a=(\sin(d_{lat}/2))^2+\cos(lat_1)*\cos(lat_2)*(\sin(d_{lon}/2))^2$$

$$c=2*a\tan 2*(\operatorname{sqrt}(a)-\operatorname{sqrt}(1-a))$$

$$D_{seg}=R*c \text{ (where } R \text{ is the radius of the Earth)}$$

Segment distance according to this formula is computed in 404. These computed values $D_{seg}$ and the parameter $T_{sam}$, or sample time between location data points, is output to a parallel routine (via element 405) to determine if the device (vehicle) is stationary, and if so, if it has been stationary long enough for the subsequent movement to be considered to be a "cold start".

If the distance $D_{seg}$ computed in 404 exceeds expected variations due to sensor signal error, device movement is affirmed, and the device land speed during the interval of $T_1$ to $T_2$ is computed in 406:

$$V_{a-b}=D_{seg}/(T_2-T_1)$$

Since location is based upon samples taken at discrete intervals, rather than a continuous analog signal, the speed computed in 406 is the mean speed of the device during the interval $T_1$ to $T_2$.

An alternative embodiment of the invention utilizes multiple sample intervals 402-404, before computing the device/vehicle velocity in 406 to compensate for signal and system variations, among other possible aberrations, and to improve system efficiency and accuracy.

Decision point 407 assigns the distance and time associated with the segment (or aggregation of segments in the multiple sample embodiment) with either "highway" or "city" driving, based upon a simple comparison to parameter $V_h$, the threshold for determining highway driving velocity: $V_{a-b}<V_h$. If the average computed velocity of the device during the segment traveled from $T_1$ to $T_2$ exceeds the $V_h$ highway velocity parameter, the distance computed for the segment is accumulated into the logged value storing total "highway" miles ($D_{highway}=D_{highway}+D_{seg}$) driven since the last device reset 408. Similarly in 412, if the velocity computed is below the $V_h$ threshold parameter, the segment is identified as "city" mileage, and the distance of the segment of movement for the device is accumulated into the logged value for total "city" miles driven since the last service reset of the device ($D_{city}=D_{city}+D_{seg}$).

In the disclosed optional embodiment of the invention, the available data for device elevation obtainable from GPS is utilized in 409, 410 and 411 to log distance driven ascending extremely steep highway grades, which constitute particularly high load operating conditions. The threshold for "extreme" grade conditions is set as parameter Grade_load. A value of 4% highway grade is considered a default value for this parameter in this embodiment of the invention.

The grade for a particular segment of highway driving is computed in 409 by dividing the distance by the change in elevation:

$$\text{Grade}_{current}=D_{seg}/(E_a-E_b).$$

Although GPS is known to be problematic for computing absolute elevations, its relative accuracy between sampled positions is sufficient for the purpose of determining the route grade percentage. Mileage for highway segments driven under extreme grade conditions (Grade$_{current}$>Grade$_{load}$) are accumulated into the system value D$_{loaded}$ in 411:

D$_{loaded}$=D$_{loaded}$+D$_{seg}$.

The computed accumulated logs of mileage driven under "city", "highway", and extreme grade highway conditions are collected in 413 and forwarded to the routine for computing the adjusted service interval mileage.

Figure 4A:
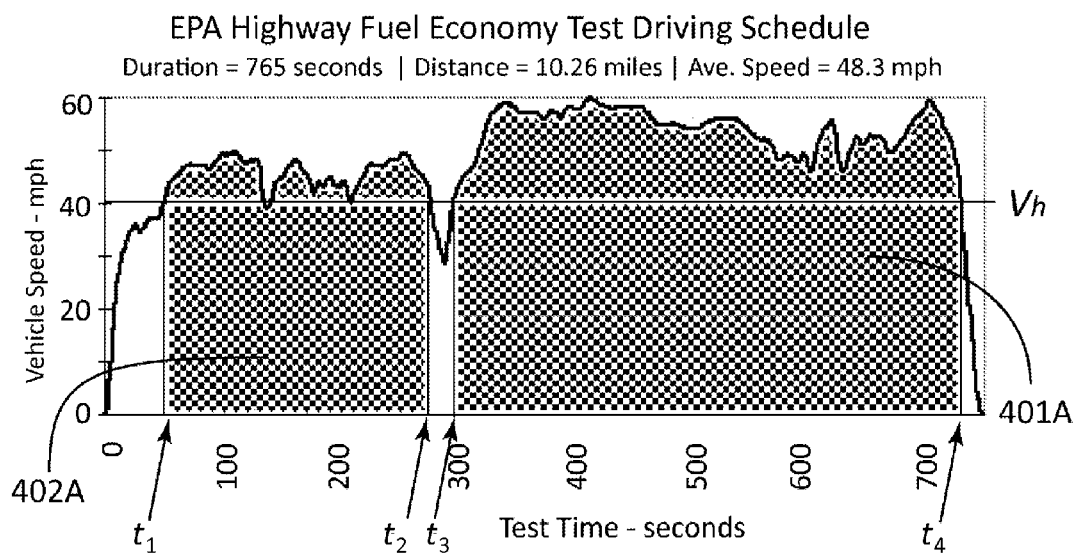
FIGS. 4A and 4B provide further explanation for this methodology.
Figure 4B:
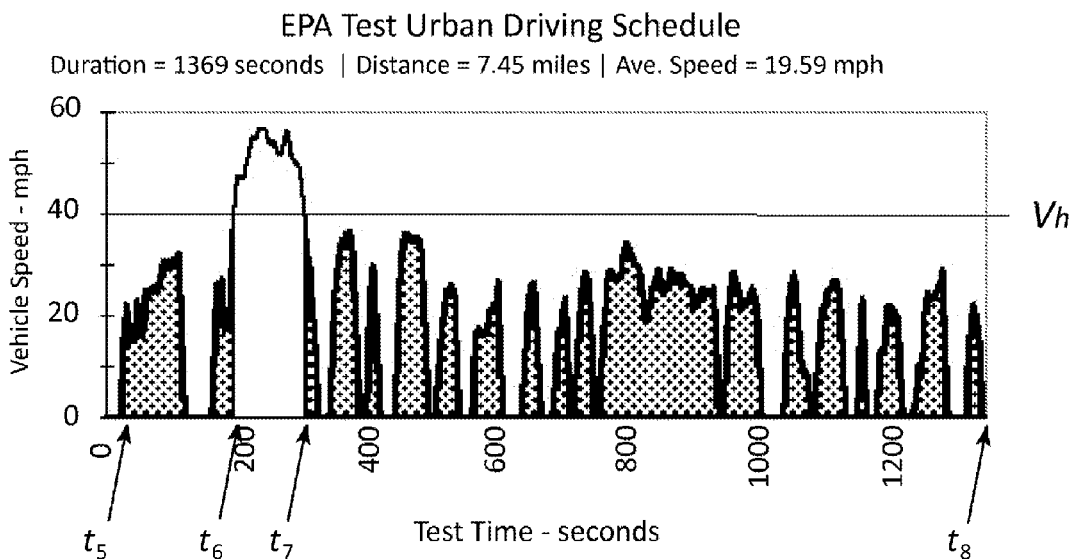

As an illustration of the practicality and utility of the disclosed methodology for determining accumulated "city" and "highway" miles, FIGS. 4A and 4B are included. FIG. 4A is an annotated version of the EPA "highway" drive cycle data used as an exemplar of driving characteristics which are typical for highway driving. Utilizing the methodology of the current invention as computing highway mileage based on device time and distances traveled in excess of threshold parameter V$_h$, the analytical solution and visualization result is shown. The integration of the device speed over the interval of time spent in excess of the threshold is the analytic solution for the precise mileage of the vehicle:

$$D_{highway} = \int_{t_1}^{t_2} v(t)\,dt + \int_{t_3}^{t_4} v(t)\,dt$$

The patterned area corresponding to the "area under the curve" 401A and 401B (combined) is the analytic solution shown graphically. The invention embodiment detailed herein provides a systematic approximation of this solution by utilizing discrete sampled intervals.

Similarly in FIG. 4B, the total city mileage corresponds to the area under the function V(t) during the periods for driving time when V(t)<V$_h$.

FIG. 5 details the invention device embodiment methodology for detecting and incorporating the high wear conditions of frequent "cold" engine starts, and the extreme high wear condition of "winter" engine starts. These factors are accumulated for the disclosed embodiment of the invention by two basic operations. Engine starts subsequent to time sufficient for the engine to cool to near ambient temperature conditions are considered "cold" starts. This is a widely accepted definition by those skilled in the art. "Winter" starts are defined as "cold" starts performed with extremely low winter ambient temperature weather conditions. Although many if not most vehicles will never experience even a single "winter" engine start as defined in this invention embodiment, millions of vehicles do. According to sound empirical published data, such conditions warrant particular attention and contribute disproportionately to both engine wear and oil degradation.

As an alternate embodiment of this aspect of the invention, the standard On Board Diagnostic (OBD) pin corresponding to the "engine on" time may be provided on a limited exception to this invention's deliberate avoidance of OBD data since such data is currently standardized for all OBD equipped vehicles.

Inputs values from the basic distance and GPS acquisition routines (FIG. 4) which calculate device movement and sample frequency are incorporated into this analysis 501. Key to determining a cold start condition in the absence of onboard sensor data is a determination of how long the device is stationary. A value in units of time T$_{stat}$ is computed and accumulated 503: T$_{stat}$=T$_{stat}$+T$_{sam}$ as long as the device remains within the bounds of the location device signal error 505: D$_{seg}$<=D$_{err}$. If the stationary time for the device exceeds the "engine rest" parameter E$_{rest}$ 506 [T$_{stat}$>E$_{rest}$] subsequent motion of the device is considered a "cold" start, and accordingly logged 507 [Cold_start_log=Cold_start_log+1].

Once device movement such as this is logged as a "cold" start, the ambient temperature is queried by either Internet based sources 511, 512, or by an embedded sensor within the device itself 514.

Engine starts that are not merely "cold" but that occur at ambient temperatures below a set "winter" threshold Temp$_{amb}$<Temp$_{min}$ 510 are logged as "winter starts, and the winter start log incremented accordingly 513:

Winter_start_log=Winter_start_log+1

Accumulated log values for total "cold" starts and total "winter" starts for the engine 508 are forwarded 509 to the mileage adjustment routine detailed in FIG. 6.

FIG. 6 details the methodology of this embodiment of the invention for modifying or adjusting the predicted next regular vehicle service by incorporating the wear factors computed in the routines detailed in FIGS. 4 and 5.

Each time the mileage adjustment routine is initiated or run 601, only the actual accumulated city, highway, and high grade highway miles (D$_{city}$, D$_{highway}$, D$_{loaded}$) are factored as inputs 602. Similarly, the logs of "cold" and "winter" starts (Cold_start_log, Winter_start_log) 603 are not modified by this portion of the invention system but used only as part of the predictive computation.

First, a global correction factor for general wear of city miles driven vs. highway miles driven is computed. As an example for this embodiment, a city mile is estimated to have the same wear as 2 highway miles, thus the City driving parameter is 2 as computed in 607.

[D$_{city\_adjusted}$=D$_{city}$*City_F(city multiplier)]

"Cold" starts are clearly a standard aspect of any vehicle operation and thus only an abnormally high frequency of "cold" starts is factored into the prediction adjustment. "Cold" start frequency per 100 miles is computed 604:

Cold_start_freq=Cold_start_log/(D$_{city}$/100)

and compared against a threshold parameter considered by an abnormally high frequency of cold starts 605:

Cold_start_freq>Cold_start_max.

If such a condition exists, which is measured across all "city" mileage accumulated, a wear penalty is assessed, increasing the effective or adjusted city miles 606:

D$_{city\_adjusted}$=D$_{city\_adjusted}$*Cold_start_factor.

"Winter" cold starts, which represent extreme wear condition, are included as a penalty unless very infrequent. The frequency is computed 609:

Winter_start_freq=Winter_start_log/(D$_{winter}$/1000)

and then tested 610:

Winter_start_freq>Winter_start_freq_max.

Operating a vehicle under frequent "winter" start conditions adds considerable effective wear mileage 611:

D$_{city\_adjusted}$=D$_{city\_adjusted}$*Winter_start_factor.

Highway steep grade load driving is penalized as a high wear operating condition 608:

D$_{highway\_adjusted}$=D$_{highway}$+D$_{loaded}$*grade_factor and the effective highway miles driven are increased by the set parameter.

Finally, the computed adjusted or effective city miles and adjusted or effective highway miles are deducted from the ideal or specified interval for periodic service set by the manufacturer 612:

$$D_{service} = D_{ideal} - D_{city\_adjusted} - D_{highway\_adjusted}$$

This value is available at any time by query from the device operator and can be set to trigger predictive notifications sent to the operator's or owner's mobile phone by text message, or to the owner by email 613.

Figure 7:
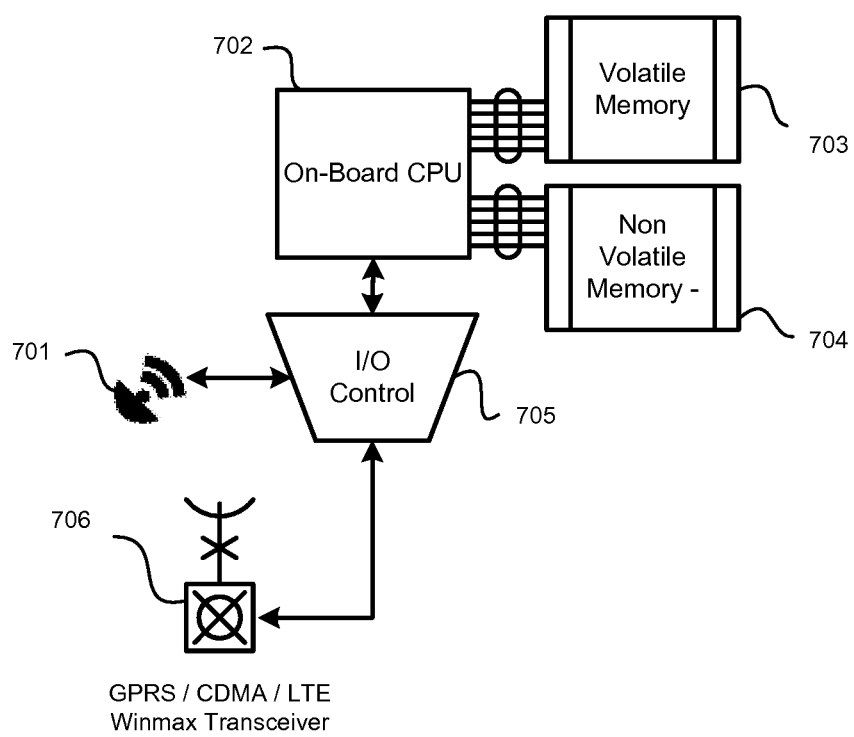

FIG. 7 provides a basic system component diagram illustrating the interaction of the most relevant aspects for the alternative embodiment device, including the location awareness unit 701, the device CPU 702, volatile on board memory 703 for processing system data and instructions during operation, and non-volatile memory 704 for storing operation code as well as the accumulation logs for the system such as mileage, cold starts, etc. Communication with the device owner or operator and system management data hub are accomplished in this embodiment via a GPRS transceiver 706.

FIG. 8 provides details of the process 800 for the alternative embodiment of the invention for assessing driver risk, including detailed input from Internet sources and other mobile device sensors and monitoring capabilities. The device, whether installed in the vehicle or implemented by a mobile device, monitors for the presence of an identified driver in the vehicle 802 by monitoring the identities emitted by a short range data protocol utilized by the device 804. Information and logging of individual drivers is aggregated during the process (see below 820).

After the device automatically initiates (by presence detection) and detects significant motion 806 by monitoring the location aware sensor 808, it begins logging computed motion, locations, time and the other sensor information as indicated below. Information is retrieved 810 from the Internet pertaining to road conditions, such as freezing weather, snow, ice, rain, or fog 812. Many sources are available for integrating online weather information into devices including the National Weather Service and commercial services such as HAMweather/aeris weather API. Similarly, online sources 812 are used to log traffic laws corresponding to detected location information 810.

As reported by the Centers for Disease Control (CDC), distracted driving is known to be a paramount danger and risk for drivers, and accounted for over 3,200 road deaths and 300,000 road injuries in 2011. In this embodiment of the invention, phone activity is monitored as a distracted driving risk 814, Various activities are ranked for risk factors. These includes use of the phone handheld, hands-free, dialing the phone, text messaging, Internet browsing, the use of social media, and the use of other smartphone applications 816, Also, the microphone is monitored for excessively loud vehicle interior, which could indicate a variety of distracted conditions 816. Here, ambient noise is defined as the background noise in the interior of the vehicle as measured by the phone microphone. Such ambient noise can include road or vehicle noise, sirens, honking, passenger shouting or talking, and loud music, among other sources. Various studies have been done which indicate varying effects on distracted driving from different sources. In various embodiments, signal processing and the standard noise pressure "A-weighting" scale adjustment may be used to refine the analysis related to the type and amount of distracting noise. For example a Fast Fourier Transform analysis may be used to determine the sound frequency spectrum, and known human voice ranges may be detected and emphasized in the calculation. 816. In various embodiments, the driver identity may be used 818 in connection with traditional actuarial risk factors such as age sex, driving records which are retrieved from a centralized data source 820. The same online database may be utilized for aggregating driver identities and logs 820. Finally the risk data may be compiled and analyzed 822 then utilized for fleet vehicle and driver reports, insurance carries, or other owners, such as parents 824.

In the alternate embodiments of the invention disclosed above, the invention of tracking a vehicle and analyzing movement and other device sensor information, for an identified utility is applied to driver risk assessment as opposed to vehicle wear assessment. In these alternate embodiments, individual driver tracking is detailed and has wide applications from fleet vehicle/driver tracking (without reliance upon written logs, which can be forged), to insurance carrier vehicle premium assessment, to parental supervision.

It will be understood that the particular embodiments described in detail herein are illustrative of the invention and that many other embodiments are applicable. The principal features highlighted herein may be employed in many embodiments within the scope of the claim.

We claim:

1. A device associated with an individual for in-vehicle use that provides driving behavior analysis comprising:
   a location aware sensor;
   a data transceiver system for communicating over the internet;
   a non-volatile memory component for storing instructions for processing the vehicle location data and driving behavior;
   a volatile memory component for storing data during when processing of instructions related to the vehicle location and driving behavior;
   a central processing unit for processing instructions and data related to the vehicle location, and driving behavior;
   a short range wireless communication component for detecting proximity of an identified vehicle to said device, and which initiates tracking the vehicle location without user initiated input to start said tracking;
   instructions stored in memory for computation of vehicle location over time;
   instructions stored in memory for logging, analysis and characterization of driving behavior associated with said individual;
   instructions stored in memory for monitoring and logging smart phone microphone ambient noise level while said vehicle is being driven by the identified driver;
   instructions stored in memory for adjusting the driving behavior analysis based on said ambient noise while said vehicle is being driven by the identified driver;
   wherein said device is a smartphone.

2. A device according to claim 1 also comprising:
   instructions for retrieving traffic regulations from the internet and comparing the regulations to the motion of the vehicle,
   instructions stored in memory for adjusting the driving behavior analysis based on the degree of conformity to said traffic regulations.

3. A device according to claim 1 also comprising:
   instructions stored in memory for monitoring and logging smart phone accelerometer sensor data while said vehicle is being driven by the identified driver; instructions stored in memory for adjusting the driving behavior analysis based on said accelerometer output while said vehicle is being driven by the identified driver.

4. A device according to claim 1 also comprising:
   wherein said device uses no data received from said vehicle, other than for detection of the presence of said device to said vehicle;
   whereby driver behavior logging is automatically initiated by said detection of presence.

5. A method for providing driving behavior analysis associated with identified drivers of a vehicle comprising;
- tracking the vehicle location, elevation, and time from a location aware sensor device; logging other device sensor data; communicating over the internet by a data transceiver system;
- managing incoming and outgoing data related to the vehicle location, other device sensor data, and the driving behavior analysis by an input/output control system;
- storing instructions for processing and vehicle location data, device sensor data and driving behavior analysis;
- storing temporary data during the processing of instructions related to the vehicle location, device sensor data and driving behavior analysis;
- processing instructions and data related to the vehicle location, device sensor data and the driving behavior analysis by a smart phone;
- computing the vehicle accumulated mileage from the vehicle location;
- determining vehicle speed for periods of time from the vehicle location;
- analyzing driving behavior based upon the determined vehicle speeds for said periods of time for one of the identified drivers;
- communicating driving behavior analysis to an identified user;
- wherein said method uses no data received from said vehicle other than for detection of the presence of said device to said vehicle;
- monitoring and logging smart phone microphone ambient noise level while said vehicle is being driven by the identified driver;
- adjusting the driving behavior analysis based on said ambient noise while said vehicle is being driven by the identified driver.

6. A method as in claim 5 also comprising:
- monitoring and logging smart phone use, and smart phone application use by the identified driver while said vehicle is being driven by the identified driver;
- adjusting the driving behavior analysis based on phone and application use by identified driver.

7. A method as in claim 5 also comprising:
- retrieving traffic regulations from the internet and comparing the regulations to the motion of the vehicle,
- adjusting the driving behavior analysis based on the degree of conformity to said traffic regulations.

8. A method as in claim 6 also comprising:
- monitoring and logging smart phone accelerometer sensor data while said vehicle is being driven by the identified driver;
- adjusting the driving behavior analysis based on said accelerometer output while said vehicle is being driven by the identified driver.

9. A method as in claim 6 also comprising:
- aggregating the analysis of driver behavior for one or more identified drivers for said vehicle to determine overall risk analysis for said vehicle.

\* \* \* \* \*